(12) United States Patent
Fazzini

(10) Patent No.: US 7,336,316 B2
(45) Date of Patent: Feb. 26, 2008

(54) DE-INTERLACING OF VIDEO DATA

(75) Inventor: Paolo Guiseppe Fazzini, Herts (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 11/725,353

(22) Filed: Mar. 19, 2007

(65) Prior Publication Data
US 2007/0171302 A1   Jul. 26, 2007

Related U.S. Application Data

(63) Continuation of application No. 10/600,246, filed on Jun. 20, 2003, now abandoned.

(30) Foreign Application Priority Data

May 1, 2003   (GB)  ................................. 0310061.7

(51) Int. Cl.
*H04N 7/01* (2006.01)
(52) U.S. Cl. .................. 348/448; 348/452; 348/458
(58) Field of Classification Search ................ 348/448, 348/452, 458; *H04N 7/01*
See application file for complete search history.

(56) References Cited

U.S. PATENT DOCUMENTS

| | | | |
|---|---|---|---|
| 5,001,563 A | 3/1991 | Doyle et al. |
| 5,347,599 A | 9/1994 | Yamashita et al. |
| 5,513,281 A | 4/1996 | Yamashita et al. |
| 5,532,751 A | 7/1996 | Lui |
| 5,579,053 A | 11/1996 | Pandel |
| 5,638,139 A | 6/1997 | Clatanoff et al. |
| 5,661,525 A | 8/1997 | Kovacevic et al. |
| 5,708,474 A | 1/1998 | Hong |
| 5,886,745 A | 3/1999 | Muraji et al. |
| 5,936,676 A | 8/1999 | Ledinh et al. |
| 6,108,041 A | 8/2000 | Faroudja et al. |
| 6,133,957 A | 10/2000 | Campbell |
| 6,181,382 B1 | 1/2001 | Kieu et al. |
| 6,262,773 B1 | 7/2001 | Westerman |
| 6,591,398 B1 | 7/2003 | Kondo et al. |

(Continued)

FOREIGN PATENT DOCUMENTS

EP    0 192 292 A1    8/1986

(Continued)

OTHER PUBLICATIONS

United Kingdom App. No. GB 0310061.7, Combined Search and Examination Report, Oct. 24, 2003.

(Continued)

*Primary Examiner*—Brian P. Yenke
(74) *Attorney, Agent, or Firm*—Flynn, Thiel, Boutell & Tanis, P.C.

(57) ABSTRACT

A method and apparatus are provided for deriving a progressive scan image from an interlaced image. In this, for each pixel to be inserted in the field from the interlaced image a difference value is derived from each pair of a set of symmetrically opposed pixels with respect to the pixel to be reconstructed and from adjacent lines to the pixel to be reconstructed. A determination is made as to which pair of pixels has the lowest difference value associated with it and the average value of this pixel is selected as a value of the pixel to be inserted.

6 Claims, 2 Drawing Sheets

U.S. PATENT DOCUMENTS

| | | |
|---|---|---|
| 6,614,484 B1 | 9/2003 | Lim et al. |
| 6,795,123 B2 | 9/2004 | Gotanda et al. |
| 6,924,844 B2 | 8/2005 | Kawamura et al. |
| 2002/0093587 A1 | 7/2002 | Michel |
| 2003/0011708 A1 | 1/2003 | Kawamura et al. |
| 2003/0038817 A1 | 2/2003 | Kawamura et al. |
| 2003/0112369 A1 | 6/2003 | Yoo et al. |
| 2004/0119884 A1 | 6/2004 | Jiang |
| 2005/0140825 A1 | 6/2005 | Kasahara et al. |

FOREIGN PATENT DOCUMENTS

| | | |
|---|---|---|
| EP | 0 567 319 A2 | 10/1993 |
| EP | 0 687 104 A2 | 12/1995 |
| EP | 0 735 748 A3 | 5/1997 |
| EP | 1 345 432 A1 | 9/2003 |
| GB | 2 372 394 A | 8/2002 |
| WO | WO 02/51143 A1 | 6/2002 |

OTHER PUBLICATIONS

International Search Report mailed Aug. 11, 2004 (Forms PCT/ISA/220 and PCT/ISA/210) with Written Opinion of the International Searching Authority (Form PCT/ISA/237) in PCT/GB2004/001825 (15 pages).

Search Report dated Jun. 1, 2005 in United Kingdom Application No. GB 0310061.7 (1 page)

Condition: $((Y_a <= Y <= Y_b) || (Y_a >= Y >= y_b))$

DE-INTERLACING OF VIDEO DATA

CROSS REFERENCE TO RELATED APPLICATION

This application is a continuation of U.S. Ser. No. 10/600 246, filed Jun. 20, 2003 now abandoned.

The present invention relates to a method and apparatus for increasing the resolution of a video image of the type that is particularly useful for TV signals (and, in general, any field based image transmission) when it is necessary to reconstruct missing information.

BACKGROUND OF THE INVENTION

Television and video images are typically displayed using a 2:1 interlace system. Resolution can be increased by converting the interlaced image to a 1:1 progressive scan image in which each field is applied to all the display lines instead of to alternate display lines.

A known conversion technique is described in EP-A-0192292. In this, pixels in three consecutive display lines from adjacent first and second 2:1 interlace fields are examined. A pair or pixels P and Q are selected from each of two different lines in the second field. These are two pixels that must closely resemble each other. A further pixel D is taken from a line in the first field and is compared with pixel P and Q to derive a median Y. This value is used to generate a new pixel Y in the second field. Use of this technique can lead to aliasing effects being generated in the thus derived progressive scan image.

An improvement is described in U.S. Pat. No. 5,001,563. In this, the median Y is compared with D. If the two differ by more than a predetermined threshold then the new pixel Y is formed from an average of P and Q. This can lead to artefacts being generated in images where two or more pairs of pixels have a high degree of resemblance.

A further technique is described in U.S. Pat. No. 5,532,751. In this, variations between pixels in an image are evaluated to detect edges or contours. If the variation between pixels is below a threshold, the orientation of an edge is deemed to have been successfully estimated and a new pixel is formed from the average of the pixels lying around the estimated orientation of the edge. If the estimate of edge orientation is unsuccessful, a new pixel is formed from the average of two vertically aligned pixels. This technique generates artefacts in pictures with two or more pairs of pixels with high mutual resemblance.

A further improvement of the technique is disclosed in U.S. Pat. No. 6,133,957. In this, the variation between pixels or sets of pixels are computed to reconstruct borders. Two variations are chosen from the ones with smallest value and a pixel is generated as a weighted average of the pixels used to derive the variations.

This technique generates objectionable artefacts in very detailed scenes, when the reconstructed pixel may not match the pixels above and below.

SUMMARY OF THE INVENTION

Embodiments of the invention address the problem of reconstructing borders or edges from an interlaced image when converted to a progressive scan image particularly when the image is part of a sequence including fast motion. In such cases, it may not be effective to use sequence data from adjacent fields, as they could be completely uncorrelated in time. Starting with the only field available at time t, which represents the fifty percent of the whole frame, and which is displayed on alternate horizontal lines, the new algorithm finds averages of pairs of pixels symmetrically situated with respect to the pixel to be derived. The average corresponding to the most resembling pair of pixels is the new pixel.

In finding the average the algorithm also performs a check on the vertical correlation of all the computed averages. If the correlation is not sufficiently high the average value is discarded. If no suitable average is found (no average passes the test), the new pixel is computed as a (potentially mathematically different) average between the pixels directly above and below. The above procedure is intended to minimize the artefacts related to a poor vertical correlation of the reconstructing pixels with respect to the other ones.

In preferred embodiments of the invention the vertical correlation of all the pixels is analysed. In particular, when reconstructing borders in a fast motion sequence of a detailed scene there is a high risk of generating a noisy frame as a result of the incorrect information coming from the edge detection part of the procedure. In such cases, the algorithm tries to find the best edge-compliant average of corresponding pixels, which also preserves the vertical correlation of the whole image thereby avoiding one-pixel objectionable spikes.

BRIEF DESCRIPTION OF THE DRAWINGS

A preferred embodiment of the invention will now be described in detail by way of example with reference to the accompanying drawings in which.

DETAILED DESCRIPTION OF PREFERRED EMBODIMENTS

Figure 1:
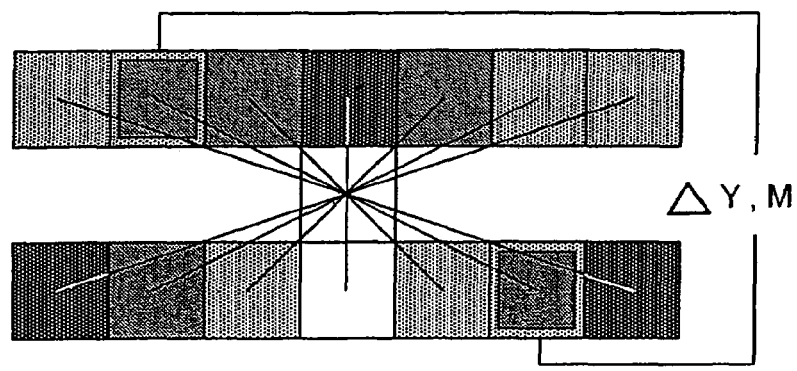
FIG. 1 shows schematically how pixels are compared in an embodiment of the invention.

FIG. 1 shows how pixels are selected to compute the averages and differences between pixels in a single frame. The differences and the averages are computed along the imaginary lines connecting two pixels symmetrically opposite with respect to the pixels to be reconstructed. Every average is tested against the values of the pixels above and below the pixels to be reconstructed as shown in FIG. 1 and only the ones passing the test are subject to further processing. When the set of vertically correlated averages have been fully populated, the one corresponding to the best match for the pixels to be reconstructed is selected.

The procedure is performed as follows:

Stage a.

With reference to the FIG. 1, differences in colour (RGB model) between pairs of pixels coupled by the imaginary lines are computed. These pixels both come from the same field in an interlaced image.

$$Dk=((Pi.R-Pj.R)*(Pi.R-Pj.R)+(Pi.G-Pj.G)*(Pi.G-Pj.G)+(Pi.B-Pj.B)*(Pi.B-Pj.B)).$$

Where Dk is the k-difference (among seven, for the case shown in FIG. 1 but the rows can be longer or shorter), Pi and Pj are pixels symmetrically placed at either end of a line passing through the pixel to be reconstructed, and R, G, B are the three components of colour (Red, Green, Blue, RGB colour model). The difference value Dk is thus derived for each of the pairs of pixels linked by the imaginary lines in FIG. 1.

Stage b.

With reference to the FIG. 1, averages in colour between the pixels coupled by the imaginary lines in FIG. 1 are computed $$Ck.R=(Pi.R+Pj.R)*0.5$$

$$Ck.G=(Pi.G+Pj.G)*0.5$$

$$Ck.B=(Pi.B+Pj.B)*0.5$$

Where Ck is the average colour and the remaining symbols are as defined in stage a.

Stage c.

Figure 2:
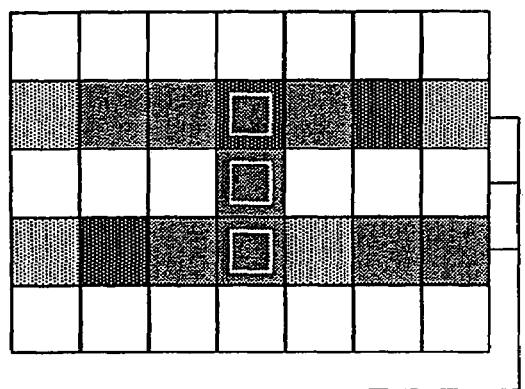
FIG. 2 shows schematically of the testing of a new pixel against the values of the pixels above and below.
Figure 3:
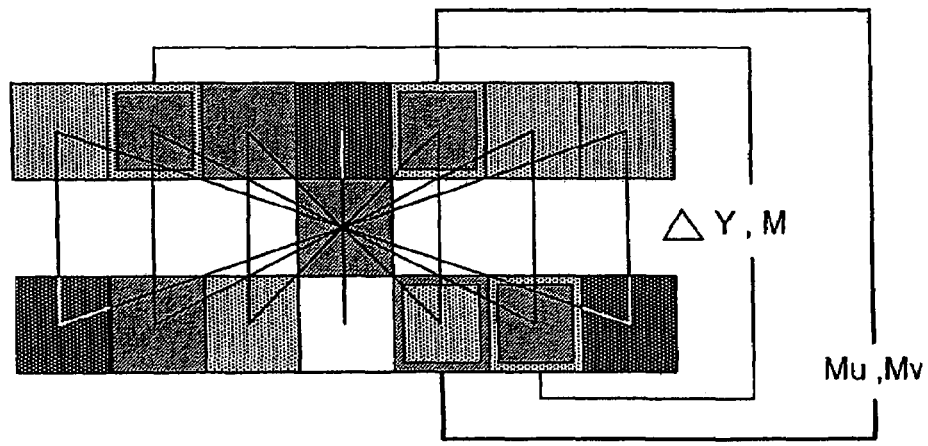
FIG. 3 shows how pairs of pixels are compared in an improved embodiment.

The colour computed in the stage b is tested against the colour of the pixels situated above and below the reconstructing pixels (FIG. 2).

With the usual symbology:
Condition (Ck.R<=Ab.R) and (Ck.R>=Be.R) and (Ck.G<=Ab.G) and (Ck.G>=Be.G) and (Ck.B<=Ab.B) and (Ck.B>=Be.B)

or (Ck.R>=Ab.R) and (Ck.R<=Be.R) and (Ck.G>=Ab.G) and (Ck.G<=Be.G) and (Ck.B>=Ab.B) and (Ck.B<=Be.B)

Where Ab is the above pixel and Be the one below. Thus the value of the pixel is tested to determine if it falls between the values of the pixels above and below. Only the averages passing the test are included in the set of possible colours for the pixel to be reconstructed.

Stage d.

The set of the averages built in the stage c, is ordered using as the ordering criterion the value of the differences Dk computed in the stage a. The pixel that has the minimum difference between the pairs of pixels from which it was derived is selected as the new reconstructed pixel for inclusion in a progressive scan image derived from the interlaced image.

Computing the differences in the way specified in stage a, is an example of state a norm in two-dimensional space. In general whatever norm could be defined. In general a norm in a vector space is only constrained to follow three properties:

$$\text{norm}(v)>=0 \quad (1)$$

$$\text{norm}(a*v)=abs(a)*\text{norm}(v) \quad (2)$$

$$\text{norm}(v+w)<=\text{norm}(v)+\text{norm}(w) \quad (3)$$

where 'v', 'w' are vectors and 'a' is scalar. Special cases of this norm in the vector space—let's say—R2 are:

$$\text{norm1}:=v \rightarrow sqrt(vx^2+vy^2) \quad (1)$$

$$\text{morm2}:=v \rightarrow abs(vx)+abs(vy) \quad (2)$$

both of them satisfy the above constraints and many other could be defined.

Figure 4:
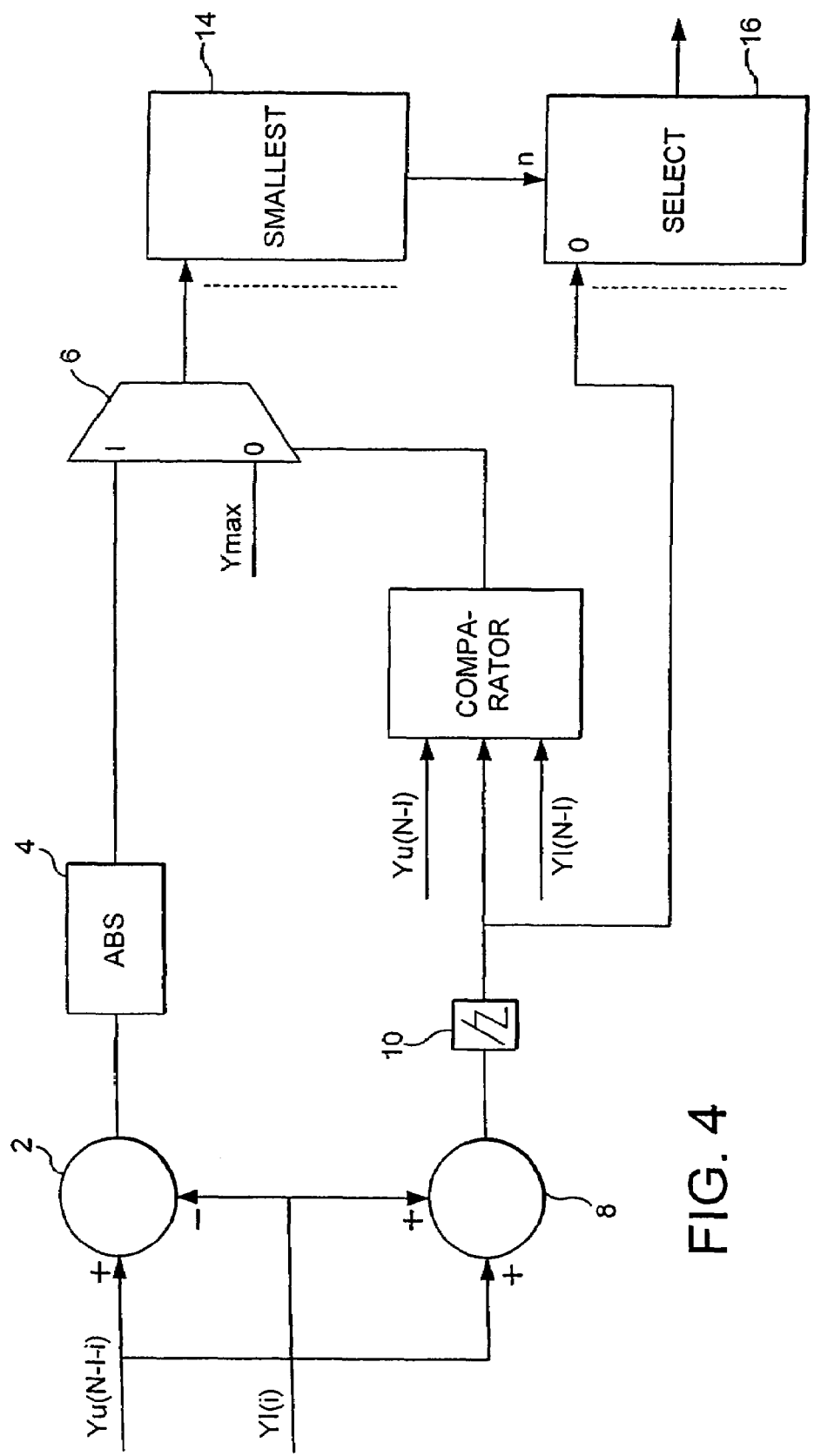
FIG. 4 shows a block diagram of an embodiment of the invention.

In the above described procedure differences and averages are computed between pairs of single pixels. It is also possible to compute differences and averages between sets of pixels in order to increase the angle of resolution of the imaginary lines between symmetrically placed pixels. In FIG. 4 this is shown as, considering differences between single pixels and pairs of pixels from each line and this increases this resolution. In general, averages and differences can be computed between any set of corresponding pixels as well as single pixels.

Also, the procedure can be applied to all the components of the colour (in the case shown the R,G and B components of the RGB model) or only some of them. For example a very useful approximation, when computing the differences, is to use just the luminance component of the YUV colour model. In general, any colour model and component of the model can be in stage a and b.

In stage c the procedure to test the compliancy of the computed averages with the vertical correlation of the picture is explained. To make the algorithm more robust when dealing with very thin lines (for example, when DVD producers sharpen shapes to generate sharper scenes) it is possible to add thresholds to the quantities against which the averages are tested. Those thresholds can be constant values (for cheap and straightforward implementation) or functions of the angle, of the computed differences of the averages themselves.

As a further approximation, it is also possible to test just some components of the averages colour against the corresponding components of the pixels above and below.

A different solution for the stage c, is not for testing just the pixels above or below the one to reconstruct, but also other pixels in the column of the reconstructing pixels spaced by more than one line from the pixel to be reconstructed as well as horizontal or vertical averages in the area of the pixels above and below.

FIG. 4 shows a block diagram of the above embodiment.

Pixel data from a frame store is supplied on two input lines YU and YL. As the pixel data is read directly from the frame store, the appropriate opposing pairs of pixels are selected one at a time with the upper pixel provided on line YU and the lower pixel on line YL.

The difference between the pixels of a pair is derived in a subtractor 2. This difference is then given an absolute value in unit 4 before being provided to a selection gate 6.

The average value of the two pixels is determined by combining their values in adder 8 and then dividing by 2 in divider 10. The average value is then provided to a comparator 12 where it is compared with the upper and lower pixels directly above and below the pixel to be reconstructed. If it falls within this range then a one is generated at the output of the comparator. If it falls outside the range then a zero is generated at the output of the comparator. This output from the comparator is used as the selection input on gate 6.

As discussed above, the 1 input to gate 6 receives an absolute value of the difference between the two pixels under consideration. The 0 input to the gate receives the maximum value of the range under consideration. Thus, when the average of a pair of pixels under consideration falls within the range defined by YU and YL directly above and below the pixel under consideration the comparator outputs a one and the absolute value of the difference between the pair of pixels under consideration is output by gate 6. The differences are supplied to a ranking unit 14 where they are placed in rank order with data defining their respective pairings.

At the same time, the average value of a pair of pixels is supplied to a multiplexer selection unit 16 which stores the average values for each pair in turn in various input locations.

When all the pairs of pixels have been through the process and the respective data is in the ranking unit 14 and multiplexer 16, the address of the pair of pixels with the smallest difference between then is used to provide an address for the multiplexer 16 to access the corresponding average value to be provided at the output of the pixels. This value is then used for the pixel to be reconstructed.

Usually pixel values which are used for deriving the averages and differences are luminance values.

In an alternative embodiment, the method operates as discussed above. However, the emphasis is on determining the minimum difference between the pairs of pixels. Once this has been determined, its average is considered and used for the pixel to be reconstructed. This occurs, irrespective of whether or not the average falls outside the range defined by the pixels directly above and below the pixel to be reconstructed. Preferably, when the average does fall outside this range, it is clamped to the upper or lower end of the range or to some point within the range, thus it cannot have a value outside the range.

A different solution for stage d, is to add an extra sub-step after finding the average corresponding to the most resembling pair of pixels. In this approach the average is not meant to be the colour of the pixel, but it is used to compute the distance in colour (difference) between said average and the colour of the pixel to reconstruct, whom value is determined with a different deinterlacing method. This distance, properly scaled, is used as a blending factor between the average itself and the colour of the pixel itself (previously reconstructed with extra deinterlacing methods). With this approach stage c is intended to be optional.

The method described above can be used in a filter to derive a progressive scan image from an interlaced image. Preferably it will be used in a system which selects the best way to reconstruct missing data in interlaced fields in dependence on the amount of motion present. When there is little motion present, data from adjacent fields can be used. When large amounts of motion are present, the procedure described above can be used. Preferably two or more methods of constructions are used in such a filter and a bleaching function is applied to these to vary the amounts they contribute to an output pixel in dependence on the amount of motion present.

The invention claimed is:

1. A method for deriving a progressive scan image from an interlaced image, in which for each pixel to be inserted in a field from the interlaced image, the method performs the steps of:

deriving a difference value from each pair of a set of pairs of symmetrically opposed pixels with respect to the pixel and from adjacent lines to the pixel to be inserted;

determining which pair of pixels has the lowest difference value associated with it; and selecting as the value of the pixel to be inserted, the average of the pair of pixels which has the lowest difference value;

wherein the step of selecting the value of the pixel to be inserted includes comparing the average value of the pair of pixels with the lowest difference value with a range of values defined by the values of the pixels directly above and directly below the pixel to be inserted, and clamping the value of the pixel to be inserted to a point in the range in dependence on the result of the comparison.

2. A method according to claim 1 wherein each of said set of pairs of pixels is composed of one pair only.

3. A method according to claim 1 wherein each of the sets of pairs of pixels comprises pixels in a plurality of rows.

4. A method according to claim 1 wherein each of the sets of pixels comprises a plurality of pixels and has a center at a reference point, adjacent to the pixel to be inserted.

5. A method according to claim 1 including the step of first deriving average values for each pair of the set of pairs of pixels, determining which pairs have averages which fall within a range of values between the values of pixels above and below the pixel to be inserted, and in which the step of determining the pair of pixels with the lowest difference value and the step of selecting the value of the pixel to be inserted are performed only for pixels whose averages fall within this range.

6. An apparatus for deriving a progressive scan image from an interlaced image, comprising means for:

deriving a difference value from each pair of a set of pairs of symmetrically opposed pixels with respect to a pixel to be inserted in the image from adjacent lines to the pixel to be inserted;

means for determining which pair of pixels has the lowest difference value associated with it; and means for selecting as the value of the pixel to be inserted the average value of the pair of pixels which has the lowest difference value, including means for comparing the average value of the pair of pixels with a range of values defined by the values of the pixels directly above and directly below the pixel to be inserted, and means for clamping the value of the pixel to be inserted to a point in the range in dependence on the result of the comparison.

* * * * *